United States Patent Office 3,505,339
Patented Apr. 7, 1970

3,505,339
PIPERIDINE INTERMEDIATES FOR 4-(4-PIPERI-
DINYL-METHYL OR -1-ETHYL)AMINO-7-CHLO-
ROQUINOLINES
Denis M. Bailey, East Greenbush, N.Y., assignor to Sterling Drug Inc., New York, N.Y., a corporation of Delaware
No Drawing. Filed Nov. 23, 1966, Ser. No. 596,401
Int. Cl. C07d 29/28, 33/52
U.S. Cl. 260—293        4 Claims

ABSTRACT OF THE DISCLOSURE 4-(4-piperidinylmethyl or -1-ethyl)amino-7-chloroquinolines where 4-piperidinyl is substituted at its 1-position by ethyl or 2-hydroxyethyl, having chemotherapeutic and pharmacological properties, are prepared by reacting 4,7-dichloroquinoline with the corresponding 1-substituted-4-piperidinyl-methyl or -1-ethylamines, the latter novel amines being prepared by various generally known reduction procedures.

---

This invention relates to compositions of matter known in the art of chemistry as substituted-4-aminoquinolines, to intermediates therefor, and preparation thereof.

The invention sought to be patented, in its composition aspect, resides in the compounds of the Formula I

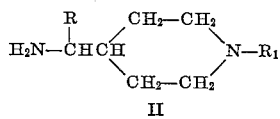

where R is hydrogen or methyl and $R_1$ is ethyl or 2-hydroxyethyl.

The invention sought to be patented, in another composition aspect, resides in the compounds of the Formula II

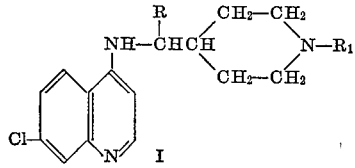

where R is hydrogen or methyl and $R_1$ is ethyl or 2-hydroxyethyl.

The invention sought to be patented, in its process aspect, resides in the process which comprises heating the compound of Formula II with 4,7-dichloroquinoline to form the compound of Formula I.

The tangible embodiments of the composition aspect of the invention possess the inherent general physical properties of being white crystalline solids melting between about 100° and 300° C., which are substantially insoluble in water in free base form and soluble in water in the form of their acid-addition salt, and which are of varying solubility in free base form in organic solvents. Examination of these compounds and their said intermediates reveals, upon infrared and nuclear magnetic resonance spectrographic analyses, data confirming the molecular structure assigned to the compounds. These data, taken together with the nature of the starting materials, mode of synthesis and results of elementary analysis, positively confirm the structures of the compositions and intermediates sought to be patented.

The tangible embodiments of the composition aspect of the invention possess the inherent applied use characteristics of exerting antimalarial and anti-inflammatory activities in animal organisms, as determined, respectively, by standard chemotherapeutic and pharmacological evaluation procedures in test animals.

The compounds of Formula I are useful both in free base form and in acid-addition salt form and both forms are within the purview of the invention, and are considered to be one and the same invention. The acid-addition salts are simply a usually more convenient form for use; and, in practice, use of the salt form inherently amounts to use of the base form. The acids which can be used to prepare the acid-addition salts are preferably those which produce, when combined with the free base, pharmacodynamically acceptable salts, that is, salts whose anions are relatively innocuous to the animal organism in pharmacodynamic doses of the salts, so that the beneficial properties inherent in the free base are not vitiated by side effects ascribable to the anions; in other words, the latter do not substantially affect the pharmacodynamic properties inherent in the cations. In practicing my invention, I found it convenient to employ the phosphate or hydrochloride salt. However, other appropriate pharmacodynamically acceptable salts within the scope of the invention are those derived from mineral acids such as hydrobromic acid, hydriodic acid, nitric acid, sulfamic acid, and sulfuric acid; and organic acids such as acetic acid, citric acid, tartaric acid, lactic acid, methanesulfonic acid, ethanesulfonic acid, quinic acid, and the like, giving the hydrobromide, hydriodide, nitrate, sulfamate, sulfate, acetate, citrate, tartrate, lactate, methanesulfonate, ethanesulfonate and quinate, respectively.

The acid-addition salts are prepared preferably by reacting the free base and acid in an organic solvent, e.g., ethanol, in which case the salt separates directly or can be obtained by concentration of the solution.

Although pharmacodynamically acceptable salts are preferred, all acid-addition salts are within the scope of my invention. All acid-addition salts are useful as sources of the free base form even if the particular salt per se is not desired as the final product, as for example when the salt is formed for purposes of purification or identification, or when it is used as an intermediate in preparing a pharmacodynamically acceptable salt by ion exchange procedures.

The manner and process of making and using the invention will now be generally described so as to enable a person skilled in the art of medicinal chemistry to make and use the same, as follows:

Preparation of the intermediates are prepared from generally known starting materials by generally known reduction procedures shown structurally as follows:

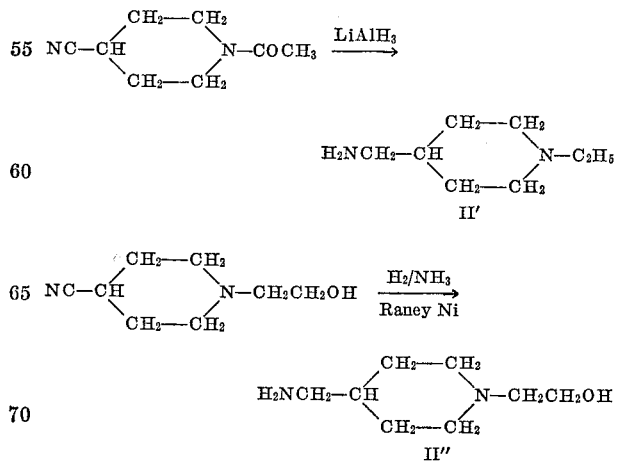

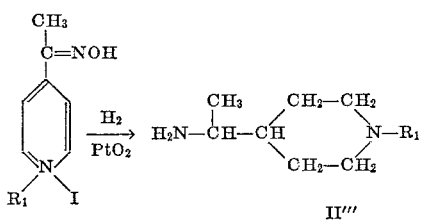

where $R_1$ is ethyl or 2-hydroxyethyl. Thus, 4-aminomethyl-1-ethylpiperidine (II′) is obtained by reduction of 4-cyano-1-acetylpiperidine with lithium aluminum hydride; 4 - aminomethyl-1-(2-hydroxyethyl)piperidine (II″) is formed by catalytic hydrogenation of 4-cyano-1-(2-hydroxyethyl)piperidine in the presence of ammonia, preferably in methanol, using Raney nickel as the catalyst; and, 4-(1-aminoethyl)-1-ethyl (or 2-hydroxyethyl)piperidine (II‴) is obtained by catalytic hydrogenation of 4-acetyl-1-ethyl(or 2-hydroxyethyl)pyridinium iodide (or bromide) oxime using platinum oxide as the catalyst.

The final products of Formula I are prepared by heating said intermediate of Formula II (II′, II″ or II‴) with 4,7-dichloroquinoline. This reaction is carried out by heating the reactants, preferably with stirring under an inert atmosphere, e.g., nitrogen, at about 150 to 250° C., preferably between about 150 and 220° C. Although equimolecular quantities of the reactants can be used, best results were obtained by using about a two to one molar ratio of the amine to 4,7-dichloroquinoline. Alternatively, the reaction can be run in the presence of phenol, thereby allowing the reaction to be run between about 150 to 160° C. In view of the formation of 7-chloro-4-phenoxyquinoline which reacts more readily with the amine at the lower temperature. Use of about a one-half to one molar ratio of the phenol to 4,7-dichloroquinoline was found to produce good results.

The best mode contemplated for carrying out the invention will now be set forth as follows:

(A) PREPARATION OF INTERMEDIATES (1) 4-(1-aminoethyl) - 1 - ethylpiperidine (Formula II, $R=CH_3$ and $R_1=C_2H_5$).—The oxime of 4-acetylpyridine was prepared and alkylated as follows: A solution of hydroxylamine acetate was prepared from 69.5 g. of hydroxylamine hydrochloride and 82 g. of sodium acetate in 300 ml. of warm (50° C.) water and 100 g. of 4-acetylpyridine was added all at once with stirring until crystallization occurred. The mixture was kept on the steam bath with occasional stirring for one hour and was then chilled in ice for one hour. The solid was filtered with suction, washed with ice water and dried on the filter for a few hours. Final drying was accomplished in a vacuum oven at 60° C. for two to three days. The yield of 4-acetylpyridine oxime, M.P. 160–161° C., was 98.4 g. (87.4%). The oxime in one liter of ethyl acetate was stirred and refluxed while 130 ml. of ethyl iodide was added as rapidly as possible. After a reflux period of three and one-half hours, the mixture was cooled to 50° C. and filtered. The yellow solid was washed with ethyl acetate and dried at 60° C. under vacuum. The yield of 4-acetyl-1-ethylpyridinium iodide oxime of M.P. 164–169° C. was 149.4 g. (71% of theory). Reduction of the above salt was accomplished in 350 ml. of absolute ethanol over 1.5 g. of platinum oxide at an initial hydrogen pressure of 818 pounds and an initial temperature of 23° C. followed by a four hour heating period at 80–90° C. The uptake was 85% of theory. The catalyst was filtered from the cooled reaction mixture and most of the solvent was distilled off through a short Vigreux column. The pot residue was digested for a few minutes with 27.6 g. (1 equivalent) of dry sodium methoxide and then ether was added to precipitate most of the inorganic salts. After filtering off the precipitated salts, the filtrate was concentrated in vacuo to a low volume and the residue was fractionated under water pump vacuum. The yield of 4-(1-aminoethyl)-1-ethylpiperidine of B.P. 91–94° C. at 7 mm. and $n_D^{25}$ 1.4654–1.4662 was 29.9 g. (37.6% of theory).

(2) 4-aminomethyl - 1 - ethylpiperidine (Formula II, $R=H$ and $R_1=C_2H_5$).—To 150 ml. of acetic anhydride at 25–30° C. was added dropwise with stirring 45 g. of 4-cyanopiperidine. The resulting mixture was stirred for thirty minutes and the excess acetic anhydride and acetic acid formed by the reaction were distilled off in vacuo to yield, as an oil, 1-acetyl-4-cyanopiperidine. To a suspension containing 24 g. of lithium aluminium hydride and 600 ml. of tetrahydrofuran was added dropwise over a period of four hours a slurry of the 1-acetyl-4-cyanopiperidine in anhydrous ether. The reaction mixture was refluxed with stirring overnight (about sixteen hours). The reaction mixture was allowed to cool to room temperature and to its was added dropwise 74.4 g. of ethylene glycol in 400 ml. of tetrahydrofuran. The resulting mixture was stirred for two hours and filtered through infusorial earth. The filtrate was distilled in vacuo to yield, as a 23.9 g. fraction boiling at 87.5–90.1° C. at 6–7 mm., 4-aminomethyl-1-ethylpiperidine.

(3) 4-aminomethyl-1-(2-hydroxyethyl)piperidine (Formula II, $R=H$ and $R_1=CH_2CH_2OH$).—A mixture containing 55 g. of 4-cyanopiperidine, 26.4 g. of ethylene oxide and about 200 mg. of para-toluenesulfonic acid was stirred with gentle warming (60° C.) on a steam bath for thirteen hours and then allowed to stand at room temperature for several days. The solvent was evaporated off in vacuo and the remaining viscous oil was distilled in vacuo to yield a 47.1 g. fraction of 4-cyano-1-(2-hydroxyethyl)piperidine, B.P. 122–123° C. at 1 mm., $n_D^{25}=1.4890$. A mixture containing 46.4 g. of 4-cyano-1-(2-hydroxyethyl)piperidine, 350 ml. of 23% (w./w.) of ammonia in methanol and about 5–10 g. of Raney nickel was heated at about 100–110° C. until the hydrogenation was completed (about four hours). The reaction mixture was filtered to remove the catalyst and the filtrate evaporated in vacuo to remove the solvent. The remaining oil was distilled in vacuo to yield 36 g. of 4-aminomethyl-1-(2-hydroxyethyl)piperidine, B.P. 99–100° C. at 10.3 mm.

(4) 4 - (1-aminoethyl)-1-(2-hydroxyethyl) - piperidine (Formula II, $R=CH_3$ and $R_1=CH_2CH_2OH$).—This compound is prepared following the last step of the procedure described in Example A–1 by catalytic hydrogenation of 4-acetyl-1-(2-hydroxyethyl)pyridinium bromide oxime using platinum oxide. The 4-acetyl-1-(2-hydroxyethyl) pyridinium bromide was prepared as in Example A–1 by reacting 4-acetylpyridine oxime with 2-hydroxyethyl bromide.

(B) PREPARATION OF FINAL PRODUCTS (1) 7 - chloro - 4 - {[1-(1-ethyl-4-piperidinyl)-ethyl] amino}quinoline (Formula I, $R=CH_3$ and $R_1=C_2H_5$).— A mixture of 4,7-dichloroquinoline and two molar equivalents of 4-(1-aminoethyl)-1-ethylpiperidine was stirred under nitrogen in an oil bath at 150–160° for four hours. The product was taken up in dilute hydrochloric acid and the pH was adjusted to 7 with concentrated ammonium hydroxide. Ice was added during the neutralization. The mixture was extracted twice with ether and the organic phase was discarded. The aqueous portion was made strongly basic with 35% sodium hydroxide solution and the oily product was extracted with ether. Evaporation of the solvent left an oil containing product and unreacted side-chain amine. The latter was removed by distillation at 0.1 mm. and steam bath temperature using a short-path still or a rotary evaporator. The residual 7-chloro-4-{[1-(1-ethyl-4-piperidinyl)ethyl]amino}quinoline was converted to its diphosphate salt as follows: The base was dissolved in hot water containing 10% in excess of two equivalents of phosphoric acid (0.05–0.07 mole of base/

100 ml.) and the solution was filtered. The filtrate was boiled down to a low volume with scratching and seeding until crystals formed in the hot solution. The complete precipitation of product was achieved by the addition of hot ethanol. The salt was recrystallized by dissolving it in water, boiling down the solution to crystallization and addition of ethanol. There was thus obtained 7-chloro-4-{[1-(1-ethyl-4-piperidinyl)ethyl]amino}quinoline diphosphate, M.P. 272–275° C. (dec.).

(2) 7 - chloro - 4 - [(1-ethyl-4-piperidinylmethyl)-amino]quinoline (Formula I, R=H and $R_2=C_2H_5$), M.P. 125.5–126.5° C., was obtained following the procedure described in Example B-1 using 32.7 g. of 4-aminomethyl-1-ethylpiperidine, 19.8 g. of 4,7-dichloroquinoline and a heating period of ninety minutes at 180–190° C., after an initial exothermic reaction had subsided (started at 170° C. and raised the temperature of the reaction mixture to about 217° C.). This compound is converted into its diphosphate salt as in Example B-1. The above reaction was also run using 46.5 g. of 4-aminomethyl-1-ethylpiperidine, 32.5 g. of 4,7-dichloroquinoline, 7.5 g. of phenol, and a heating period of four hours at 157° C. There was thus obtained 41 g. (82%) of 7-chloro-4-[(1-ethyl-4-piperidinylmethyl)amino]quinoline.

(3) 7 - chloro - 4 - {[1-(2-hydroxyethyl) - 4 - piperidinylmethyl]amino}quinoline (Formula I, R=H and $R_1=CH_2CH_2OH$).—A stirred mixture of 36 g. of 4-aminomethyl-1-(2-hydroxyethyl)piperidine and 22.6 g. of 4,7-dichloroquinoline was heated under nitrogen at 150–160° C. for about ten hours. The reaction mixture was dissolved in dilute hydrochloric acid and the pH was adjusted to 7 with concentrated ammonium hydroxide whereupon a granular precipitate separated. The precipitate was collected, dried over $P_2O_5$ in vacuo at room temperature and was recrystallized once from acetonitrile, once from chloroform-acetonitrile and then from methanol-isopropyl acetate to yield 9.2 g. of 7-chloro-4{[1-(2-hydroxyethyl)-4-piperidinylmethyl]-amino}quinoline, M.P. 141–147° C. The dihydrochloride, M.P. 265–268° C., was obtained by adding 5.5 ml. of concentrated hydrochloric acid to a solution of the free base in boiling isopropyl alcohol, allowing the hot solution to cool and collecting the hydrochloride salt.

(4) 7 - chloro - 4{[1 - [1 - (2 - hydroxyethyl) - 4-piperidinyl]ethyl}amino]quinoline (Formula I, R=$CH_3$ and $R_1=CH_2CH_2OH$) is obtained following the procedure described in Example B-1 using 4,7-dichloroquinoline and 4-(1-aminoethyl)-1-(2-hydroxyethyl)piperidine. The compound is converted to its diphosphate salt as in Example B-1 or to its dihydrochloride salt as in Example B-3.

The aminoquinolines of Formula I have been found to have antimalarial activity when tested in Swiss mice against blood-induced infections with *Plasmodium berghei*. Their activity is from about one-third to equal that of chloroquine and their oral toxicity in mice is about the same or less than that of chloroquine, one of the compounds, namely, 7-chloro-4-{[1-(1-ethyl-4-piperidinyl)ethyl]amino}quinoline (Example B-1), being only about one-half as toxic as chloroquine.

When tested for anti-inflammatory activity by the standard evaluation procedure of inhibiting carrageenin-induced local foot edema in fasted rats, the aminoquinolines of Formula I have been found to cause about 35 to 50% inhibition at 100 mg./kg. orally.

The subject matter which the applicant regards as his invention is particularly pointed out and distinctly claimed as follows:

1. A compound of the formula

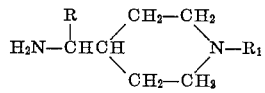

where R is methyl when $R_1$ is ethyl or 2-hydroxyethyl and where R is hydrogen when $R_1$ is 2-hydroxyethyl.

2. A compound according to claim 1 where R is methyl and $R_1$ is ethyl.

3. A compound according to claim 1 where R is methyl and $R_1$ is 2-hydroxyethyl.

4. A compound according to claim 1 where R is hydrogen and $R_1$ is 2-hydroxyethyl.

References Cited

UNITED STATES PATENTS

| | | | |
|---|---|---|---|
| 2,233,970 | 3/1941 | Andersag et al. | 260—288 |
| 3,262,936 | 7/1966 | Zenitz et al. | 260—293 |

OTHER REFERENCES

Sugasawa et al., J. Pharm. Soc. Japan 76, 968–70 (1956).

Paul et al., Bull. Soc. Chim. France 1958, 736–41.

HENRY R. JILES, Primary Examiner

G. THOMAS TODD, Assistant Examiner

U.S. Cl. X.R.

260—288, 294.7, 999

PO-1050
(5/69)

UNITED STATES PATENT OFFICE
CERTIFICATE OF CORRECTION

Patent No. 3,505,339          Dated April 7, 1970

Inventor(s) Denis M. Bailey

It is certified that error appears in the above-identified patent and that said Letters Patent are hereby corrected as shown below:

Column 3, line 33, "In" should read --in--. Column 5, line 11, "$R_2$" should read --$R_1$--.

SIGNED AND
SEALED
AUG 11 1970

(SEAL)
Attest:

Edward M. Fletcher, Jr.
Attesting Officer

WILLIAM E. SCHUYLER, JR.
Commissioner of Patents